3,054,784
Patented Sept. 18, 1962

3,054,784
POLYMERISATION PROCESSSES
Peter Volans, Llanrumney, Cardiff, Wales, assignor to Monsanto Chemicals Limited, London, England, a British company
No Drawing. Filed Nov. 10, 1959, Ser. No. 851,950
Claims priority, application Great Britain Nov. 13, 1958
14 Claims. (Cl. 260—84.1)

This invention relates to the production of solid polymers including homopolymers and copolymers of ethylenically unsaturated hoydrocarbons, for instance, those of ethylene and propylene.

Much work has been carried out in recent years on polymerisations of ethylenically unsaturated hydrocarbons to solid plastic materials, and especially to the polymerisation of ethylene. The precise character of a polyethylene depends much upon the conditions under which the ethylene is polymerised, and the optimum conditions for carrying out the polymerisation have been the subject of considerable research. The earlier developed processes employ high temperatures of perhaps up to 300° C. in addition to high pressures, for instance in the region of 1200 atmospheres. These high pressure processes have been used for many years, but more recently developed methods have become available in which milder polymerisation conditions have been possible. This has been facilitated by the discovery of extremely active catalysts. In general this means that lower operating pressures are effective, and consequently the use of expensive high pressure plants can be avoided. Moreover, the resulting polyethylenes tend to have properties which are more desirable in certain applications than the properties of conventional high pressure or thermal polyethylene; in particular the density is higher and the polyethylenes are more rigid.

Accordingly the present invention is directed to a catalytic polymerisation process for the production of a solid polymer, homopolymer or copolymer, in which an ethylenically unsaturated hydrocarbon is polymerised in the presence of (*a*) a catalyst which comprises in combination an aluminium halide, an aromatic mercury compound and a finely-divided vanadium oxide, and (*b*) a polymerisation medium comprising a halogenated liquid.

The process of the invention can advantageously be employed in the polymerisation of a wide variety of ethylenically unsaturated hydrocarbons, although it is particularly useful in polymerising olefins, such as ethylene and propylene. Other olefins which can be subjected to the process include butylenes and pentenes. Moreover the ethylenically unsaturated hydrocarbon can be a diene, for instance a butadiene such as 1:3-butadiene. Aromatic members of the specified class of hydrocarbons are the vinylbenzenes, for instance styrene itself and alpha-methylstyrene. More than one ethylenically unsaturated hydrocarbon can be polymerised at the same time, so that copolymerisation takes place and a copolymer is formed. In this way, for example, an ethylene/propylene copolymer or a styrene/butadiene copolymer can be prepared.

The process is particularly well adapted to the production of solid polyethylenes and solid polypropylenes by polymerisation of ethylene and propylene respectively. For instance polyethylenes of a wide range of physical properties can be produced, including those in the "medium density" range, density at 22° C. between 0.920 and 0.935; and the "high density" range, density at 22° C. above 0.935. The high density range includes polyethylenes that are very linear in character and begin to approach in some ways the properties of a polymethylene. The melting points of the higher density polyethylenes are higher than that of conventional thermal polyethylenes, and polyethylenes can be obtained having Vicat softening points of at least 115° C., for instance 120° C., 130° C., or even higher.

The polymerisation catalyst used in the invention constitutes three components. These are in combination an aluminium halide, an aromatic mercury compound, and a vanadium oxide. Illustrative of this, one preferred catalyst is a mixture of aluminium bromide, diphenyl mercury and vanadium pentoxide.

Although the aluminium halide component of the catalyst mixture is preferably aluminium bromide, aluminium chloride is quite satisfactory and a mixture of aluminium halides can be employed if desired.

The second component of the catalyst, the aromatic mercury compound, is an arylmercury compound, that is to say a mercury derivative containing at least one aryl group in which a carbon atom of the cyclic nucleus is linked to a mercury atom. Typical members are phenylmercurys and tolylmercurys, for example diphenylmercury and di(p-tolyl)mercury. The arylmercury compounds may also contain other substituents in suitable instances, as in phenylmercurichloride and p-toylymercurichloride. This component can also constitute a mixture of more than one aromatic mercury compound.

The third component, the vanadium oxide, is preferably vanadium pentoxide, although other oxides can be employed, for instance vanadium trioxide.

The vanadium oxide is utilized in what can be described as a finely-divided form. In this regard the average particle size of this component can range between 0.01 to 5 microns, with a range of 0.02 to 2.5 microns being more preferred. Particle sizes of 0.1 to 1.5 microns, for instance about 0.5 micron are particularly effective. A particle, 0.5 micron in size, has a surface area of about 5 meters$^2$ per gram.

The vanadium oxide is an insoluble component of the catalyst, which should exist as fine particles dispersed in the liquid medium both before and during the polymerisation of the unsaturated hydrocarbon. Preferably the vanadium oxide, in finely-divided form, is pre-treated or "aged" in the presence of the unsaturated hydrocarbon monomer before the other two catalyst components are added. The period of pre-treatment can vary from a few minutes, for instance 10 minutes, to several hours. Good results are obtained when a pre-treatment period of from one to two hours is used. The effect on the final polymerisation is to obtain a remarkably steady reaction rate. After the pre-treatment and when the other components have been added, the vanadium oxide is still insoluble in the liquid medium.

The proportions in which the aluminium and mercury components are employed in the catalyst can vary considerably. Preferably an excess of the aluminium halide is present. Excellent results are obtained for instance where the aluminium/mercury ratio is between 1:0.05 and 1:1, particularly between 1:0.2 and 1:0.6, for example 1:0.4. The third component, the vanadium oxide, can be employed in a relatively small amount compared with the other two components, and what is virtually only a trace of a vanadium oxide such as vanadium pentoxide can result in a very efficient catalyst mixture. For instance the aluminium/vanadium ratio can usefully be from 1:0.005 or 1:0.01 to 1:0.5. Good results are obtained in the range from 1:0.05 to 1:0.3, for example 1:0.1. Larger amounts of the vanadium oxide can be present, for example the ratio can even be as high as 1:1, but there is not normally much advantage to be obtained by this means.

The polymerisation medium employed with the catalyst is of the utmost importance; it must be a liquid and one which is halogenated. Preferred halogenated liquids are chlorinated or brominated liquids, and more particularly chlorinated and brominated organic liquids. Excellent results are obtained with a chlorinated or brominated alipihatic hydrocarbon, for instance a chloro-alkene or bromo-alkene such as for instance trichloroethylene or tetrachloroethylene; or a chloro-alkane or bromo-alkane such as for example ethyl cholride, tert.-butyl chloride, chloroform, carbon tetrachloride or ethylene dibromide. Examples of suitable halogenated inorganic liquids are stannic tetrachloride and silicon tetrachloride. In general when a halogenated liquid is employed as the liquid medium it does in many instances form a loose association with the aluminium chloride or bromide, but this however is not a Friedel-Crafts complex, and does not adversely affect the polymerisation process.

Owing to the activity of the catalyst employed the process of the invention can be operated under relatively low pressures and at temperatures close to atmospheric, with all the advantages attendant on this. Thus the polymerisation can be successfully conducted between 0° and 60° C. The choice of the ethylenically unsaturated hydrocarbon will reflect somewhat the choice of a temperature in the preceding range; for example the polymerisation of ethylene can be successfully carried out between 20° and 40° C. Finally temperatures both lower and higher than the indicated range can be used in certain instances. The polymerisation can be carried out at pressures as low as 1 atmosphere; however pressures up to about 200 atomspheres which are still relatively "low" compared with those used in making what is known as high pressure or thermal polyethylene, can be used.

Preferably the process is operated under anhydrous conditions since water generally will interfere with the catalyst employed. Small quantities of water can however be tolerated. The presence of small amounts of oxygen as in the form of air does not appear to affect adversely the course of the polymerisation.

In a typical procedure the dry ethylenically unsaturated hydrocarbon in gas or vapour form is passed into the catalyst components and the liquid medium under anhydrous conditions. It is desirable that the system be agitated while polymerisation is taking place. The polymerisation product can be recovered by washing the catalyst-containing mixture with a liquid that will dissolve the catalyst; examples in suitable instances are water, hydrochloric acid, methanol, ethanol, or mixtures of these materials. The polymerisation product is finally filtered off and dried.

The invention is illustrated by the following examples. In each of these the aluminium bromide and the arylmercury components are in powdered form. The precise particle size however is not critical in that the components are soluble in the halogenated liquid media.

EXAMPLE 1

This example describes the production of a linear polyethylene of density 0.947 by polymerisation of ethylene at atmospheric pressure using a catalyst consisting of aluminium bromide, diphenylmercury and vanadium pentoxide.

Fifty cc. of trichloroethylene is placed in a 250 cc. round-bottom flask, and air is flushed out of the system by first passing through a stream of nitrogen and then a stream of ethylene. Two grams of finely-divided aluminium bromide, 1 gram of powdered diphenylmercury, and 0.001 gram of finely-divided vanadium pentoxide, the latter having a particle size of about 0.7 micron, are then added successively. The first two components dissolve in the trichloroethylene while the vanadium pentoxide remains suspended as particles in the liquid medium. The flask is flushed through again with ethylene and set up so that it can be agitated mechanically and at the same time remain connected to a source of ethylene supplied at atmospheric pressure. The flask is shaken mechanically at 300 times per minute at 20° C. until no further absorption of ethylene takes place. As the polymerisation proceeds, white flocks of solid polyethylene appear suspended in the trichloroethylene, and at the end of two hours the contents of the flask are a semisolid mass. At the end of this period the supply of ethylene is cut off and the contents of the flask are added to 500 cc. of an alcoholic hydrochloric acid solution obtained by mixing 1 volume of concentrated hydrochloric acid with 7 volumes of methanol and 2 volumes of ethanol. The mixture of polymer and acid solution are boiled for a short time to ensure dissolution of the catalyst from the polymer. The mixture is cooled, and the polyethylene filtered off. The filtered product is dried under reduced pressure to remove residual water and organic solvents.

The polyethylene is purified by extracting in a Soxhlet apparatus with boiling xylene (in which the polymer is soluble); the polyethylene is recovered from the xylene solution by adding to a large volume of methanol.

As a result 1.4 gram of a rigid polyethylene is obtained having a density of 0.947 (measured at 22° C.) and a Vicat softening point of 129.6° C. Examination of its infrared absorption spectrum confirms that the polyethylene is highly crystalline in character.

Solid polyethylene is not produced when an experiment is carried out which is similar in all respects to the preceding except that the aluminium halide (bromide) component of the catalyst is eliminated.

EXAMPLE 2

This example demonstrates the production of rigid polyethylenes, again using a catalyst consisting of aluminium bromide, diphenylmercury and vanadium pentoxide, but in which proportions of the catalyst components differ from those used in the preceding example.

Fifty cc. of trichloroethylene is placed in a 250 cc. round-bottom flask and after flushing, the catalyst is added, followed by addition of ethylene. Polymerisation is then carried out as described in Example 1. Removal of the polyethylene product from the polymerisation mass as well as purification of the same are also in the manner of that example.

The catalyst component amounts employed above are as follows:

|  | Run (1) (grams) | Run (2) (grams) |
| --- | --- | --- |
| Aluminium bromide | 0.5 | 0.4 |
| Diphenylmercury | 1 | 1 |
| Vanadium pentoxide | 0.01 | 1 |

The polyethylenes obtained in each instance exhibit similar properties to those of the product of Example 1. The quantities of each produced are 0.6 gram in run (1) and 1.5 gram in run (2).

EXAMPLE 3

This example also describes the production of a high density polyethylene by polymerisation of ethylene using aluminium bromide, diphenylmercury and vanadium pentoxide; the finely-divided vanadium pentoxide component, having a particle size of about 0.5 micron, is "aged" in the manner to be described, in the presence of the ethylene monomer prior to addition of the remaining catalyst components. A particularly smooth and steady polymerisation rate is then obtained.

The ethylene monomer to be employed is purified prior to utilisation by passing it successively through (a) 250 cc. of an aqueous solution of 25 grams of sodium hyposulphite and 25 grams of sodium hydroxide; (b) 400 cc. of an aqueous solution of 45 grams of potassium iodide, 38 grams of mercuric iodide and 75 grams of potassium hydroxide; (c) a solution obtained by adding 150 cc. of concentrated hydrochloric acid to 150 cc. of water containing 32 grams of sodium chloride and 45 grams of cupric chloride; (d) sodium hydroxide pellets; (e) silica gel; (f) active charcoal; and finally (g) a low temperature trap maintained at −78° C.

The aluminium bromide employed is an extremely pure grade prepared by gradually adding a small excess of pure liquid bromine (analytical grade; containing less than 0.01% non-volatile material) to pieces of aluminium (99.99% Al). When the exothermic reaction is completed the mixture is refluxed for a short period, and the aluminium bromide is then sublimed in a current of pure nitrogen. The resulting aluminium bromide is refluxed in contact with some fresh pieces of the aluminium, and again sublimed in a stream of pure nitrogen; the vapour is passed over more pieces of the aluminium heated at 250° C., and finally allowed to condense as a fine powder. So far as can be determined, aluminium bromide which results contains no traces of any other metals.

One-hundredth gram of finely-divided vanadium pentoxide (which has been out-gassed by subjecting it to a vacuum of $10^{-4}$ mm. of mercury for over an hour) is placed in a dry 250 cc. round-bottom flask which has been well flushed out with ethylene. The flask is set up so that it can be mechanically agitated and at the same time remain connected to a source of the ethylene at atmospheric pressure. The vanadium pentoxide is allowed to age in the presence of the ethylene for 1.5 hours, and then a solution of 0.5 gram of aluminium bromide in 25 cc. of trichloroethylene is added, followed by a solution of 0.27 gram of diphenylmercury in 25 cc. of trichloroethylene.

The flask is shaken mechanically at 300 times per minute at 30° C. for 230 minutes. As the polymerisation proceeds, polyethylene rapidly accumulates in the trichloroethylene, in the form of particles swollen by the solvent.

The ethylene supply is then cut off, and the polyethylene recovered from the catalyst by boiling with an alcoholic hydrogen chloride solution as described in Example 1.

Finally, the polymer is macerated with methanol and dried at 100° C.

In this way 12 grams of a polyethylene is obtained having a density of 0.946 (measured at 22° C.) and a Vicat softening point of 130.6° C. The product possesses a high degree of linearity.

EXAMPLE 4

This example describes the polymerisation of ethylene to give a polymer similar to that of Example 3, but in rather higher yield. The ethylene employed is purified as described in the previous example.

The catalyst employed is the same as that of Example 3 except that the aluminium bromide and the diphenylmercury are each employed in an 80 cc. portion of trichloroethylene. The polymerisation and the recovery procedure are also as described in that example, except that the polymerisation temperature is 32° C.

Eighteen grams of a polyethylene is obtained having a density of 0.943, and a softening point of 129.3° C.

EXAMPLE 5

This example describes the production of an ethylene/propylene copolymer using a catalyst consisting of aluminium bromide, diphenylmercury and vanadium pentoxide.

Fifty cc. of trichloroethylene is placed in a 250 cc. round-bottom flask and the air flushed out of the flask with a stream of pure ethylene. There are then added successively 0.01 gram of finely-divided vanadium pentoxide (average particle size 0.5 micron), 0.5 gram of powdered aluminium bromide and 0.25 gram of powdered diphenylmercury. The flask is then arranged so that it can be agitated yet remain connected at a pressure of one atmosphere to a source of a mixture of ethylene and propylene containing 25 mol percent of propylene. In this way the flask is agitated at 30° C. for 5 hours.

The resulting solid ethylene/propylene copolymer is isolated as described in Example 5.

EXAMPLE 6

This example describes the production of a polystyrene using a catalyst consisting of aluminium bromide, diphenyl-mercury and vanadium trioxide.

Fifty cc. of tetrachloroethylene is placed in a 250 cc. round-bottom flask and the air flushed out of the flask with a stream of pure nitrogen. There are then added successively 0.02 gram of finely-divided vanadium trioxide (average particle size 0.5 micron), 0.5 gram of powdered aluminium bromide and 0.2 gram of powdered diphenylmercury. Nine grams of monomeric styrene is then admitted to the flask, which is agitated mechanically at 10° C. for 3 hours and finally for 30 minutes at 45° C.

The resulting solid polystyrene is separated from the catalyst as described in the previous example.

EXAMPLE 7

This example describes the production of a styrene/butadiene copolymer using a catalyst consisting of aluminium bromide, di(p-tolyl)mercury and vanadium pentoxide.

Fifty cc. of carbon tetrachloride is placed in a 250 cc. round-bottom flask and the air flushed out of the flask with a stream of pure butadiene. There are then added successively, 0.01 gram of finely-divided vanadium pentoxide (average particle size 0.5 micron), 0.5 gram of powdered aluminium bromide and 0.25 gram of powdered di(p-tolyl)mercury. Nine grams of monomeric styrene is then admitted to the flask, which is arranged so that it can be agitated mechanically and at the same time remain connected to a source of the butadiene under a pressure of one atmosphere. The flask is agitated in this way at 30° C. for 5 hours.

The styrene/butadiene copolymer is recovered from the catalyst mixture by adding the contents of the flask with stirring to 250 cc. of an alcoholic hydrochloric acid solution obtained by mixing one volume of concentrated hydrochloric acid with 7 volumes of methanol and 2 volumes of ethanol. The copolymer is separated, mixed with a further 250 cc. of the alcoholic hydrochloric acid solution and boiled for a short time to ensure dissolution of the remaining catalyst. The mixture is cooled, the copolymer is filtered off, and finally dried to remove residual water and organic solvents. In this manner 9 grams of solid copolymer are obtained.

What I claim is:

1. In a process for producing a solid polymer by polymerising an ethylenically-unsaturated hydrocarbon of the group consisting of ethylene, propylene, butylene, pentene, butadiene, styrene, alpha-methyl-styrene, and mixtures thereof at 0–60° C. under a pressure of 1–200 atmospheres, the improvement which comprises conducting the polymerisation in a liquid medium consisting essentially of a member of the group consisting of chlorinated aliphatic hydrocarbons, brominated aliphatic hydrocarbons, stannic tetrachloride, and silicon tetrachloride and in contact with a three-component catalyst consisting of (a) 1 molar proportion of an aluminium halide, (b) 0.05–1 molar proportion of an arylmercury compound, and (c) 0.005–0.5 molar proportion of a finely-divided vanadium oxide.

2. A process for the production of a solid polymer according to claim 1, in which the liquid medium consists essentially of a chlorinated aliphatic hydrocarbon.

3. A process for the production of a solid polymer according to claim 1 in which the polymerisation is carried out using a catalyst consisting in combination of aluminium bromide, an arylmercury compound and a finely-divided vanadium oxide.

4. A process according to claim 3, in which the arylmercury compound is selected from the class consisting of diphenylmercury and di(p-tolyl)mercury.

5. A process according to claim 3, in which the vanadium oxide is vanadium pentoxide.

6. A process according to claim 1, in which the vanadium oxide is aged with the ethylenically unsaturated hydrocarbon prior to the addition of the other two components of the catalyst.

7. A process for the production of a solid polymer according to claim 1 wherein the ethylenically unsaturated hydrocarbon is ethylene.

8. A process for the production of a solid polymer according to claim 1 wherein the ethylenically unsaturated hydrocarbon is ethylene and propylene.

9. A process for the production of a solid polymer according to claim 1 wherein the ethylenically unsaturated hydrocarbon is styrene.

10. A process for the production of a solid polymer according to claim 1 wherein the ethylenically unsaturated hydrocarbon is butadiene and styrene.

11. A process for the production of a solid polymer according to claim 1 wherein the ethylenically unsaturated hydrocarbon is propylene.

12. A process for the production of a solid polymer according to claim 2, in which the liquid medium consists essentially of trichloroethylene.

13. A process for the production of a solid polymer according to claim 2 in which the liquid medium consists essentially of tetrachloroethylene.

14. A process for the production of a solid polymer according to claim 2 in which the liquid medium consists essentially of carbon tetrachloride.

References Cited in the file of this patent

UNITED STATES PATENTS

| | | |
|---|---|---|
| 2,878,241 | Schneider | Mar. 17, 1959 |
| 2,886,561 | Reynolds | May 12, 1959 |
| 2,889,314 | Fritz | June 2, 1959 |
| 2,900,374 | Aries | Aug. 18, 1959 |
| 2,910,461 | Nowlin et al. | Oct. 27, 1959 |
| 2,915,516 | Juveland | Dec. 1, 1959 |

FOREIGN PATENTS

| | | |
|---|---|---|
| 1,137,020 | France | Jan. 7, 1957 |
| 1,137,084 | France | Jan. 7, 1957 |
| 1,007,999 | Germany | May 9, 1957 |